(12) United States Patent
Drew et al.

(10) Patent No.: US 8,387,930 B2
(45) Date of Patent: Mar. 5, 2013

(54) DISPLAY STAND

(75) Inventors: Paul L. Drew, The Woodlands, TX (US); Cynthia J. Purvis, The Woodlands, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1212 days.

(21) Appl. No.: 11/796,667

(22) Filed: Apr. 27, 2007

(65) Prior Publication Data

US 2008/0265121 A1  Oct. 30, 2008

(51) Int. Cl.
*F16M 11/00* (2006.01)

(52) U.S. Cl. .................. 248/157; 248/161; 248/346.01; 248/346.03

(58) Field of Classification Search ............ 248/346.01, 248/346.03, 917, 346.3, 918, 919, 920, 923, 248/161, 157, 317
See application file for complete search history.

(56) References Cited

U.S. PATENT DOCUMENTS

| | | | | |
|---|---|---|---|---|
| 5,007,608 A | * | 4/1991 | Carroll, Jr. | 248/297.21 |
| 5,276,589 A | * | 1/1994 | Bartlett et al. | 361/679.06 |
| 5,812,368 A | * | 9/1998 | Chen et al. | 361/681 |
| 6,134,103 A | * | 10/2000 | Ghanma | 361/681 |
| 6,189,842 B1 | * | 2/2001 | Bergeron Gull et al. | 248/125.1 |
| 6,288,891 B1 | * | 9/2001 | Hasegawa et al. | 361/681 |
| 6,381,125 B1 | * | 4/2002 | Mizoguchi et al. | 361/682 |
| 6,464,195 B1 | * | 10/2002 | Hildebrandt | 248/460 |
| 6,543,734 B2 | * | 4/2003 | Yeh | 248/291.1 |
| 6,766,994 B2 | * | 7/2004 | Serbinski et al. | 248/371 |
| 6,778,196 B2 | * | 8/2004 | Nakamura | 361/680 |
| 6,822,857 B2 | * | 11/2004 | Jung et al. | 361/681 |
| 6,873,521 B2 | * | 3/2005 | Landry et al. | 361/681 |
| 6,874,743 B2 | * | 4/2005 | Watanabe et al. | 248/276.1 |
| 6,954,221 B2 | * | 10/2005 | Wu | 361/681 |
| 6,969,037 B2 | * | 11/2005 | Eby et al. | 248/460 |
| 6,987,666 B2 | * | 1/2006 | Medica et al. | 361/681 |
| 7,061,753 B2 | * | 6/2006 | Michoux et al. | 361/681 |
| 7,068,497 B2 | * | 6/2006 | Chu | 361/681 |
| 7,124,984 B2 | * | 10/2006 | Yokouchi et al. | 248/125.8 |
| 7,180,731 B2 | * | 2/2007 | Titzler et al. | 361/681 |
| 7,198,240 B2 | * | 4/2007 | Chen | 248/284.1 |
| 7,245,481 B2 | * | 7/2007 | Shimizu et al. | 361/681 |
| 7,251,127 B2 | * | 7/2007 | Ghosh et al. | 361/683 |
| 7,255,317 B2 | * | 8/2007 | Huang et al. | 248/371 |
| 7,274,557 B2 | * | 9/2007 | North et al. | 361/681 |
| 7,286,342 B2 | * | 10/2007 | Yang | 361/681 |
| 7,287,729 B2 | * | 10/2007 | Jung et al. | 248/122.1 |
| 7,775,494 B2 | * | 8/2010 | Yen et al. | 248/284.1 |
| 7,798,457 B2 | * | 9/2010 | Chih et al. | 248/284.1 |
| 8,050,024 B2 | * | 11/2011 | Hsu et al. | 361/679.27 |
| 8,052,102 B2 | * | 11/2011 | Hu | 248/157 |
| 8,132,765 B2 | * | 3/2012 | Liu | 248/157 |
| 2004/0011932 A1 | * | 1/2004 | Duff | 248/157 |
| 2004/0012917 A1 | * | 1/2004 | Jung et al. | 361/681 |
| 2005/0157457 A1 | * | 7/2005 | Kim | 361/681 |
| 2007/0076358 A1 | * | 4/2007 | Hsu | 361/681 |
| 2007/0146979 A1 | * | 6/2007 | Chen et al. | 361/681 |

* cited by examiner

*Primary Examiner* — Nkeisha Smith

(57) ABSTRACT

Various embodiments are directed to stand for a display. One embodiment includes a base, a display, and a mounting arm that includes a first end connected to the base and a second end pivotally connected to the display.

7 Claims, 5 Drawing Sheets

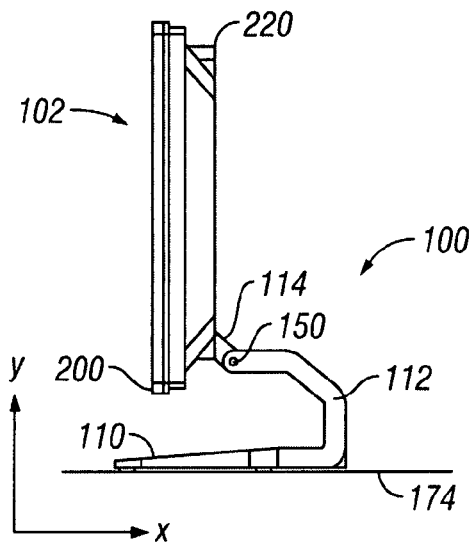
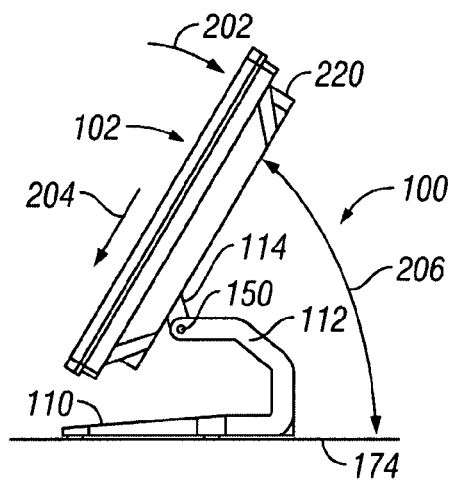
FIG. 3A
FIG. 3B
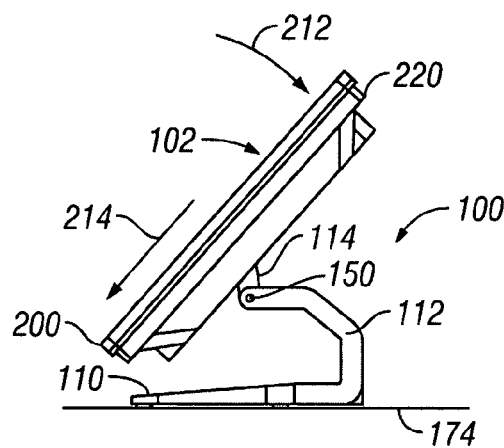
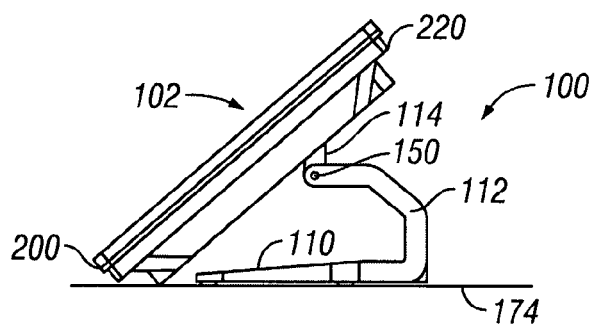
FIG. 3C
FIG. 3D

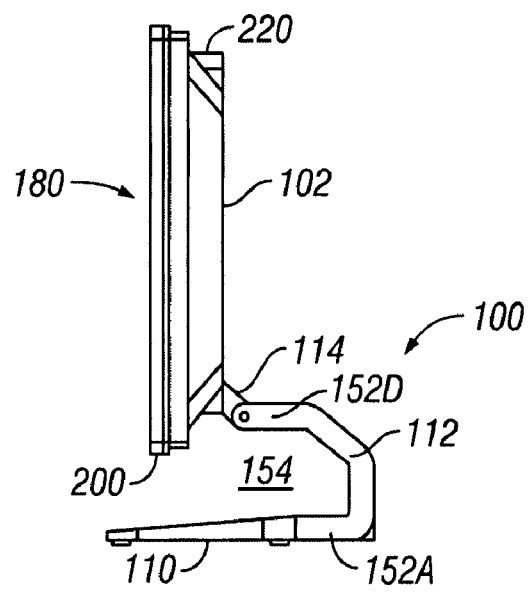
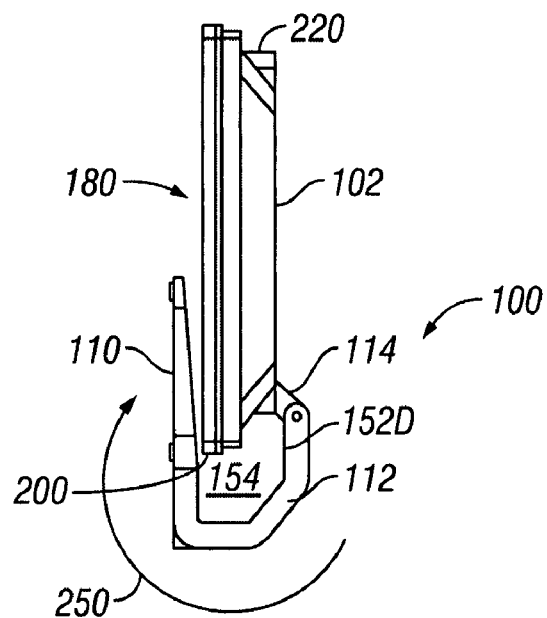
FIG. 4A    FIG. 4B
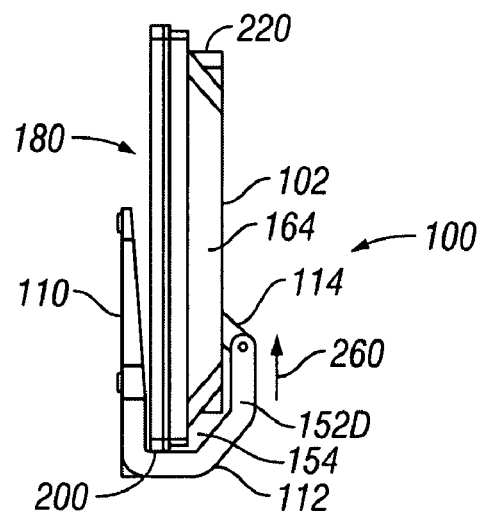
FIG. 4C

DISPLAY STAND

BACKGROUND

In order to meet demands of users, computing devices are becoming more sophisticated and often have a variety of modular and multi-task capabilities. In some computing environments, for example, the display may have to be positioned to various angles and orientations with respect to the base in order to function as both a display for entering data via a keyboard or as a display for entering data with a stylus.

Displays with fixed or limited adjustability do not provide sufficient viewing angles to meet the needs of some users. If a display is rigidly fixed to the base or provided with limited adjustability, then some viewing angles are not available to users. For instance, it may be difficult to position the screen at a preferred viewing distance or at a preferred angle to eliminate distracting reflections. In still other instances, the screen may have to be adjusted to provide an ergonomic position while being used as a touch screen.

BRIEF DESCRIPTION OF THE DRAWINGS

FIG. 3A is side view of a display stand with a display in a first position according to an exemplary embodiment.

FIG. 3B is side view of a display stand with a display in a second position according to an exemplary embodiment.

FIG. 3C is side view of a display stand with a display in a third position according to an exemplary embodiment.

FIG. 3D is side view of a display stand with a display in a fourth position according to an exemplary embodiment.

FIG. 4A is side view of a display stand with a display in an upright position according to an exemplary embodiment.

FIG. 4B is side view of a display stand with a display in a partially collapsed position according to an exemplary embodiment.

FIG. 4C is side view of a display stand with a display in a fully collapsed position according to an exemplary embodiment.

DETAILED DESCRIPTION

Embodiments are directed to a stand for supporting and adjusting a display. One embodiment includes a stand with a single hinge and a height adjustment mechanism attached to one end of a mounting arm of the stand.

In one embodiment, the height adjustment mechanism includes a slide member that slides along an elongated rectangular shaped channel, recess, or groove located in a back surface of the display. The height adjustment mechanism enables the display to be quickly adjusted to a variety of vertical heights with respect to a support surface on which the stand is positioned. The display is also adjustable to a variety of positions to provide a user with numerous different viewing angles. The stand is foldable into a compact configuration that utilizes minimal space for packaging and shipping. In this configuration, the display is partially positioned within a cavity formed within a curved portion of the mounting arm.

Figure 1A:
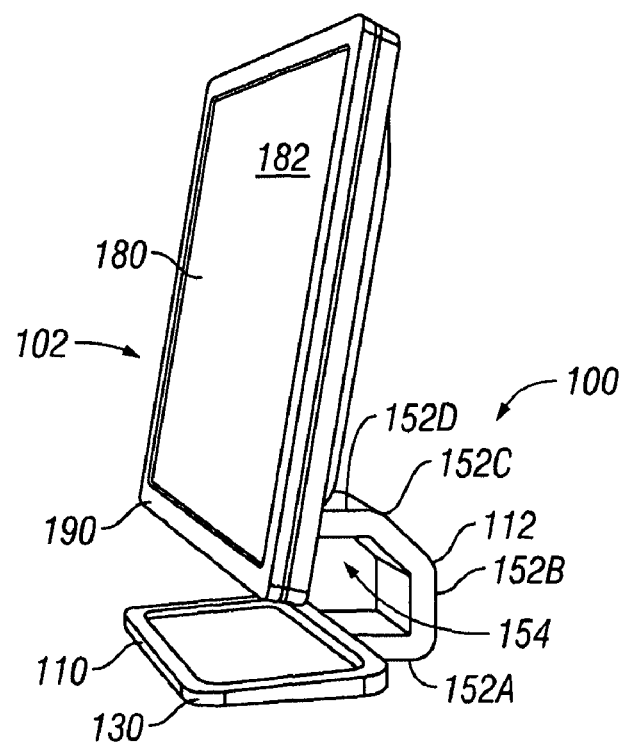
FIG. 1A is a front perspective view of a display stand and display according to an exemplary embodiment.
Figure 1B:
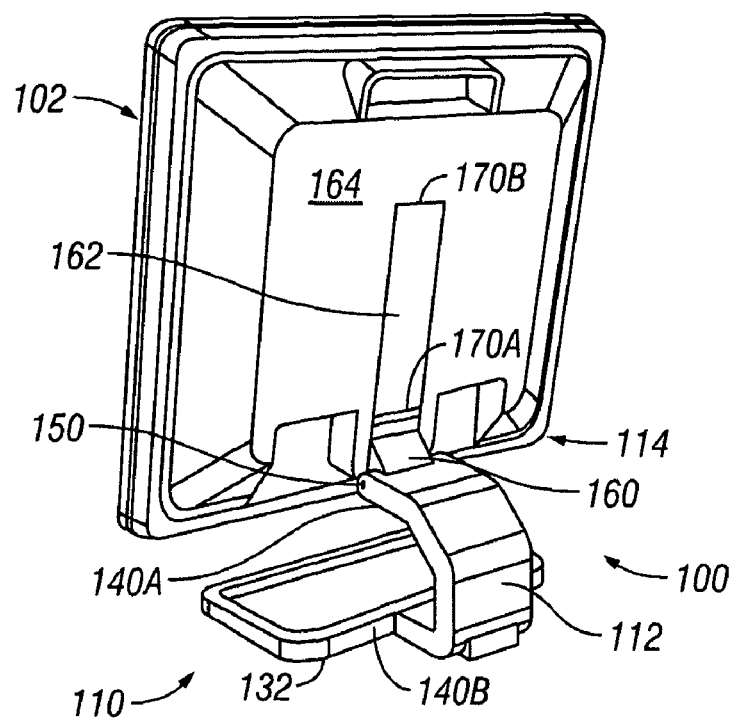
FIG. 1B is a rear perspective view of a display stand and display according to an exemplary embodiment.

FIGS. 1A and 1B show a display stand or stand 100 connected to a display 102 according to an exemplary embodiment. The stand 100 generally includes a base 110, a mounting arm 112, and a height adjustment mechanism 114. The base 110 has a rectangular shape with rounded corners and includes a flat side 130 for resting on a surface, such as a desktop. One side 132 of the base connects to an end of the mounting arm 112. The mounting arm 112 has a curved shape that extends from a first end 140A to a second end 140B. A display hinge 150 attaches at the first end 140A and connects to the display 102. This display hinge provides a rotational or pivotal point between the mounting arm 112 and display 102.

The mounting arm 112 can have various shapes and sizes. By way of example only, the mounting arm has a U-shape, a semi-circular shape, or a curved configuration. In one embodiment, plural straight sections 152A-152D are joined together to form the mounting arm. Alternatively, the mounting arm has fewer or greater than four sections. As another example, the mounting arm is formed of a continuous curvature that forms a semicircle, arc, or substantial U-shape, to name a few examples.

In one embodiment, the mounting arm 112 is formed of a strong rigid material (example, metal and/or polymer) and has a curvature or curved shape that forms a cavity or space 154.

As best shown in FIG. 1B, the height adjustment mechanism 114 connects to end 140A of the mounting arm 112 and includes a slide member 160 that fits within a channel 162 formed in a backside 164 of display 102. The slide member 160 moves or slides along the channel 162 and enables a user to adjust a vertical position of the display 102. Further, in one embodiment, the slide member 160 is trapped or locked in the channel 162 to connect the mounting arm 112 to the display 102.

The slide member 160 is movable within the channel 162 from a lower or bottom end 170A to a top or upper end 170B. As shown in FIGS. 1A and 1B, while the slide member 160 is positioned at the lower end 170A, the display 102 is in a raised vertical position.

Figure 2A:
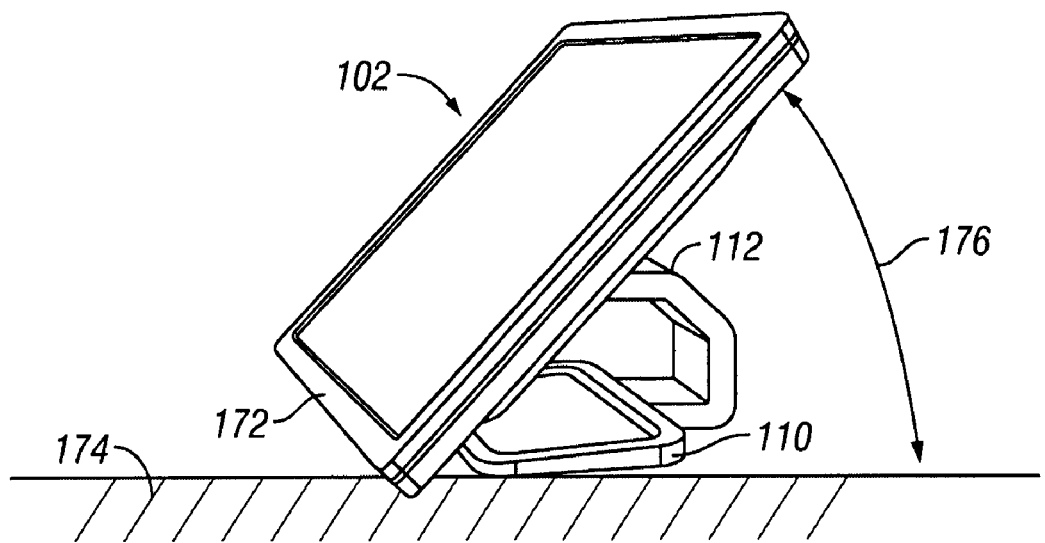
FIG. 2A is another front perspective view of a display stand and display according to an exemplary embodiment.
Figure 2B:
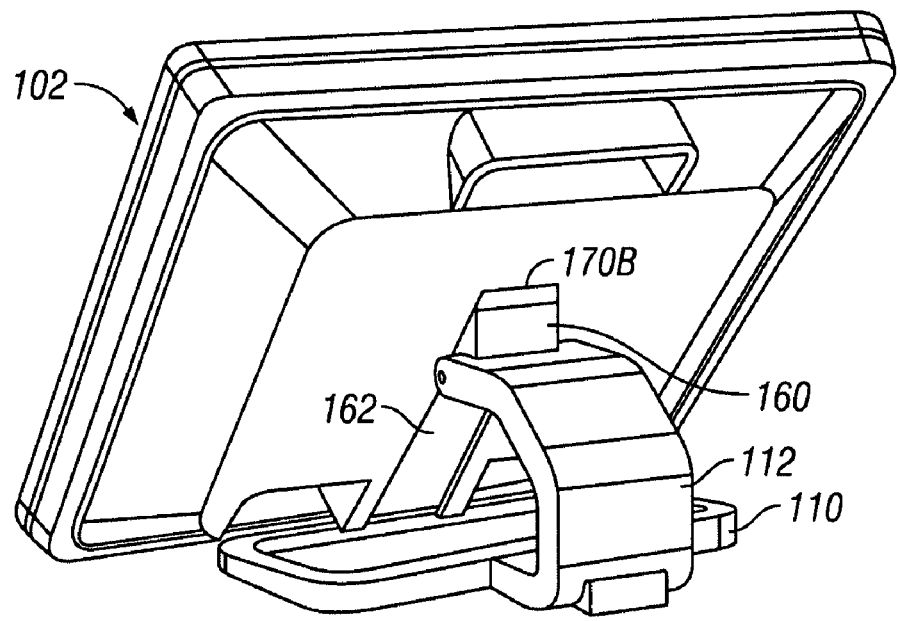
FIG. 2B is another rear perspective view of a display stand and display according to an exemplary embodiment.

FIGS. 2A and 2B show the display 102 in a lowered vertical position. In this position, the slide member 160 is positioned at the upper end 170B of channel 162. A bottom side 172 of the display 102 rests on a support surface 174, such as a desktop. The surface of the display 102 forms an angle (shown with arrows 176) with the support surface 174.

As shown in FIGS. 1A and 1B, the display 102 generally comprises a back surface 164 and a front surface 180 with a view screen 182. In one embodiment, the screen 182 is a touch sensitive screen that both displays data and inputs data when touched or activated. By way of example, screen 182 is a backlit color liquid crystal display (LCD) wherein data is entered through the screen using, for example, the stylus or a user's finger. Images that appear on the screen provide a graphical user interface (GUI) and are controlled with software (including handwriting recognition software) such that displayed images are contacted or activated to input, edit, alter, or otherwise access information. When a user touches or activates a designated area on the screen, for example, the touch sensitive screen transmits a signal to a processor (example, central processing unit, CPU, located in the display).

The display 102, in some embodiments, functions as a computer, such as a stand-alone personal computer (PC) or a tablet PC. By way of example only, the display 102 includes one or more of a CPU, hard drive, memory, infrared ports, disk drives, PC card slots, batteries, universal serial bus (USB) ports, power connectors, keyboard or monitor connectors, multibays, network connectors, CompactFlash card slots, power connectors, other input/output (I/O) ports, and numerous buttons and switches (such as Enter, Esc, Tab, Menu, Power, etc.), just to name a few examples. Many of these features are generally shown at 190 (FIG. 1A).

The mounting arm 112 couples to the display 102 with a hinge 150 that uses any one of various hinge-type connections. By way of example, these connections include a cylinder/sleeve connection, ball/socket connection, or other connection that enables two structures to move relative to each other.

In one embodiment, the hinge 150 and height adjustment mechanism 114 use friction as a means to maintain the display in locked or sturdy positions. For example, when sufficient rotational force or torque is applied to display 102, the frictional forces in hinge 150 and height adjustment mechanism 114 are overcome so the display 102 rotates or moves. Once the user has released the display, the frictional forces in the hinge 150 and height adjustment mechanism 114 maintain the display 102 in the desired position.

The mounting arm 112 couples the display 102 to the base 110 such that the display is movable to a plurality of different viewing angles or positions. FIGS. 3A-3D and 4A-4C illustrate some of these viewing angles and positions. In order to illustrate the various movements of the display 102, a two axis coordinate system is shown in FIG. 3A as having an X-axis and a Y-axis. The X-axis represents a horizontal orientation (example, surface 174 on which base 110 is positioned), and the Y-axis represents a vertical orientation (example, height from surface 174 on which the base 110 is positioned).

FIG. 3A shows a side view of the display stand 100 and display 102. The display 102 is in a vertical position parallel with the Y-axis and perpendicular with the X-axis or surface 174. In this position, the height adjustment mechanism 114 is adjacent a bottom or lower side 200 of the display 102.

FIG. 3B shows a side view of the display 102 being rotated (see arrow 202) in a clockwise direction about hinge 150 and being moved downwardly (see arrow 204) toward surface 174. Here, the bottom side 200 of the display has moved closer to surface 174. The surface of the display 102 forms an acute angle (shown with arrows 206) with the support surface 174.

FIG. 3C shows a side view of the display 102 being further rotated (see arrow 212) in a clockwise direction about hinge 150 and being moved further downwardly (see arrow 214) toward surface 174. Here, the bottom side 200 of the display has moved further closer to surface 174.

FIG. 3D shows a side view of the display 102 being positioned with bottom side 200 abutting surface 174. In this position, the height adjustment mechanism 114 is adjacent a top or upper side 220 of the display 102.

FIGS. 4A-4C show a side view of the display stand 100 and display 102 progressing from an upright position (FIG. 4A) to a partially collapsed position (FIG. 4B) and finally to a fully collapsed position (FIG. 4C).

As shown in FIG. 4A, the mounting arm 112 forms a space or cavity 154 between two legs 152A and 152D. As shown in FIG. 4B, the display stand 100 is rotated in a clockwise direction (shown along arrows 250) such that bottom side 200 of display 102 moves into cavity 154. In this position, the height adjustment mechanism is adjacent the bottom side 200. As shown in FIG. 4C, the display stand 100 is moved in an upward direction (shown with arrow 260) to further position bottom side 200 deeper into cavity 154. While moving to this position, the height adjustment mechanism moves away from bottom side 200 and toward top side 220.

In the fully collapsed position shown in FIG. 4C, the bottom half of the display 102 is positioned in cavity 154. The base 110 is adjacent and parallel to front side 180 of the display 102, and leg or portion 152D of the mounting arm 112 is adjacent and parallel to back side 164 of the display 102. In a collapsed position, the display stand and display are compact for shipping or transport.

Figure 5:
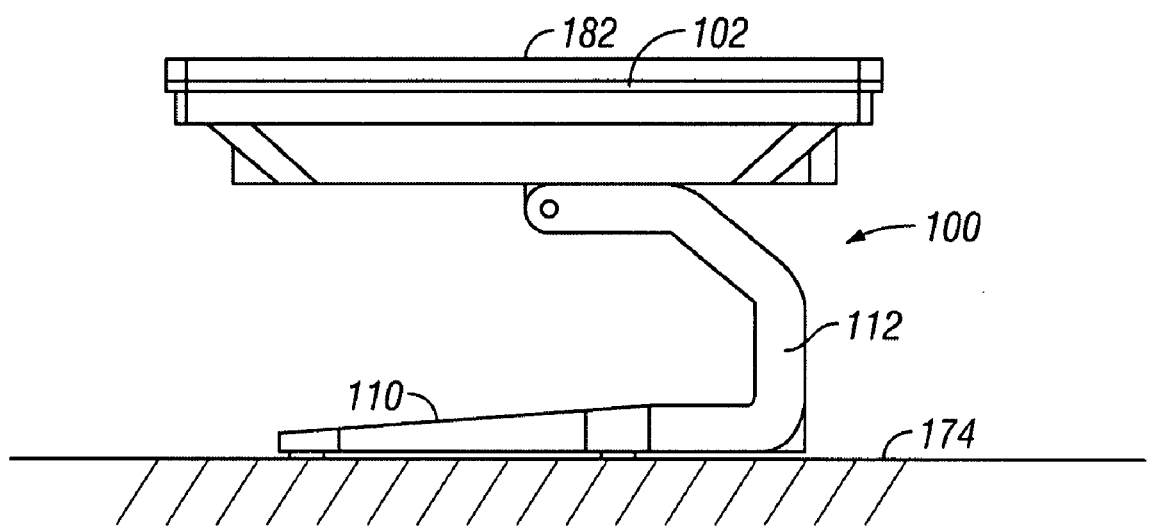
FIG. 5 is side view of a display stand with a display in a horizontal position according to an exemplary embodiment.

FIG. 5 is side view of a display stand 100 with display 102 in a flat position In this position, the screen 182 is in a horizontal position and parallel with the base 110 and a surface 174. Here, the display has a flat or horizontal position so it can be used as a writing surface as a tablet PC.

While the invention has been disclosed with respect to a limited number of embodiments, those skilled in the art will appreciate, upon reading this disclosure, numerous modifications and variations. It is intended that the appended claims cover such modifications and variations and fall within the true spirit and scope of the invention.

What is claimed is:

1. A method, comprising:
sliding an electronic display along one end of a mounting arm to change a vertical height of the display with respect to a support surface;
pivoting the display at the one end of the mounting arm to change a viewing angle of the display;
positioning one end of the display in a space formed between two legs of the mounting arm; and
sliding the display along the one end of the mounting arm into the space in order to package the display.

2. The method of claim 1 further comprising:
positioning a first end of the display adjacent the one end of the mounting arm;
altering a vertical position of the display by moving the one end of the mounting arm to a second end of the display, the second end being oppositely disposed from the first end.

3. The method of claim 1 further comprising, adjusting the display to a position parallel to a support surface so the display rests on the mounting arm.

4. The method of claim 1 further comprising, sliding the mounting arm along a recess in the display in order to alter the vertical position of the display.

5. The method of claim 1 further comprising, moving the display from a first position that is perpendicular with the support surface to a second position that is angled with the support surface, wherein one end of the display rests on the support surface in the second position.

6. The method of claim 1 further comprising, positioning an end of the display into a semi-circular shaped recess formed by the mounting arm in order to position the display and mounting arm for shipping.

7. The method of clam 1 further comprising, sliding the display along the one end of the mounting arm to change an orientation of the display.

* * * * *

UNITED STATES PATENT AND TRADEMARK OFFICE
CERTIFICATE OF CORRECTION

PATENT NO. : 8,387,930 B2
APPLICATION NO. : 11/796667
DATED : March 5, 2013
INVENTOR(S) : Paul L. Drew et al.

Page 1 of 1

It is certified that error appears in the above-identified patent and that said Letters Patent is hereby corrected as shown below:

In the Claims:

In column 4, line 58, in Claim 7, delete "clam" and insert -- claim --, therefor.

Signed and Sealed this
Twenty-fifth Day of June, 2013

Teresa Stanek Rea
*Acting Director of the United States Patent and Trademark Office*